United States Patent [19]

McIntyre et al.

[11] Patent Number: 4,928,580

[45] Date of Patent: May 29, 1990

[54] AUTOMOBILE WINDSCREEN CLEANING SYSTEM

[75] Inventors: Keith W. McIntyre, Tigard, Oreg.; Scott J. McIntyre, Fort Meyers, Fla.

[73] Assignee: H. Novis Inc., Auburn Hills, Mich.

[21] Appl. No.: 302,371

[22] Filed: Jan. 27, 1989

[51] Int. Cl.$^5$ .............................................. B60S 1/54
[52] U.S. Cl. ...................................................... 98/2.1
[58] Field of Search ............................ 98/2, 2.1, 2.19; 296/91, 96.15

[56] References Cited

U.S. PATENT DOCUMENTS

| | | | |
|---|---|---|---|
| 1,932,798 | 10/1933 | Millard | 98/2.1 |
| 1,959,069 | 5/1934 | Sugden | 98/2.1 |
| 2,849,760 | 9/1958 | Boeke et al. | 98/2.1 |
| 2,926,396 | 3/1960 | Hess | 98/2.1 |
| 3,616,871 | 11/1971 | West | 98/2.19 |
| 3,738,252 | 6/1973 | Cardinale | 98/2.1 |
| 3,747,500 | 7/1973 | Redd | 98/2.1 |
| 3,769,898 | 11/1973 | Ide | 98/2 |
| 4,538,851 | 9/1985 | Taylor | 296/91 X |

FOREIGN PATENT DOCUMENTS 2426827 12/1985 Fed. Rep. of Germany ......... 98/2.1
874270 10/1942 France .................... 98/2.1

Primary Examiner—Harold Joyce
Attorney, Agent, or Firm—Krass & Young

[57] ABSTRACT

An automobile windscreen clearing and cleaning system in which cleaning of the windshield is accomplished primarily by a high velocity, essentially laminar flow of air from a distributed lineal nozzle located adjacent the surface of the windscreen. In one specific embodiment a foil-shaped body of rigid but flexible material is bonded to the outside lower surface of the windshield to form a plenum which in turn defines a lineal nozzle from which air is emitted at high velocity to flow up and over the windshield surface for cleaning the windshield surface as well as to create an air curtain. A turbine or other high velocity high pressure air source carried by the vehicle supplies air to the plenum. In another embodiment the foil-shaped rigid but flexible body is mounted for movement with a windshield wiper arm such that the plenum and nozzle are reversed in orientation relative to the windshield surface during each half cycle of travel to maintain the air curtain emitted by the nozzle in advance of the nozzle and in the direction of nozzle movement.

16 Claims, 3 Drawing Sheets

AUTOMOBILE WINDSCREEN CLEANING SYSTEM

INTRODUCTION

This invention relates to automotive vehicle windscreen clearing and cleaning systems and more particularly to a system in which the clearing and cleaning of the windshield is accomplished primarily by a high velocity, essentially laminar flow of air from a distributed lineal nozzle located adjacent of the surface of the windscreen.

BACKGROUND OF THE INVENTION

Current automotive vehicle windscreen cleaning and clearing systems are essentially based on the mechanical scrubbing and squeegee action of a flexible wiper blade on the windscreen surface. In essence, the conventional windshield wiper system makes no effort to prevent rain, snow, insects and other objectionable materials from striking the windshield surface; rather, the conventional windshield wiper system depends on periodically cleaning or clearing such materials from the windscreen surface. To assist in this function it is also known to spray the windscreen surface with cleaning and de-icing liquids by means of a reservoir and pump system carried on the vehicle.

The prior art also contains some limited recognition that flowing air can be used to clear a vehicle windscreen or rear window or to maintain a cleared condition once it has been achieved by another mechanism. For example, wind deflectors are commonly used in combination with vehicle top-mounted luggage racks to direct air flowing as a result of relative motion between a vehicle and ambient air downwardly over the backlight of the vehicle. In addition, U.S. Pat. No. 4,678,224 issued July 7, 1987 to Erwin F. Geppert discloses the use of plural discrete nozzles for the purpose of generating an air curtain on a military vehicle, which air curtain prevents the accumulation of airborne mud particles on small observation windows of the vehicle.

In addition, U.S. Pat. No. 1,717,904 issued June 18, 1929 to H. Abernethy discloses the use of an air curtain to clear and maintain the front windscreen of a trolley car. The Abernethy system comprises a pipe which is mounted so as to extend across the upper outside surface of the trolley windscreen. The pipe is provided with a plurality of discrete nozzles, non-uniformly spaced along the pipe, to direct a plurality of fan-shaped air blasts downwardly over and along the surface of the windscreen. A compressed air tank is mounted on and carried by the vehicle and may be supplied with air by the air brake system of the trolley.

The problems and disadvantages attending such prior art systems are generally well-known. Conventional windshield wipers are notorious for breakage, streaking and scoring of windscreen surfaces and, under heavy rain conditions, providing inadequate visibility as a result of the accumulation of water between clearing strokes. Use of conventional wipers for the removal of accumulated ice and frost from the outside surface of the windscreen is well-known to require by way of supplementation either manual scraping or extraordinary patience while the conventional interior heating system of the vehicle achieves an operative temperature. The Abernethy trolley car system, although interesting in concept, is aesthetically non-pleasing and hydrodynamically unfeasible for high speed vehicles.

SUMMARY OF THE INVENTION

According to the present invention, a wide area essentially continuous and laminar sheet of high velocity air is effectively and economically utilized to clear a windscreen surface. To achieve this objective, a plenum, preferably fabricated as an extruded, rigid but flexible body, is mounted in close association with the outside surface of the windscreen and exhibits a continuous lineal outlet nozzle portion which cooperates with the windscreen surface to emit a continuous air curtain extending across a substantial area of the windscreen. Additional means are carried by the vehicle for supplying air under pressure to the plenum such that the air directed from the nozzle portion flows at high velocity across the windscreen surface. The air supply means is preferably thermally associated with the vehicle exhaust system so that the air supplied to the plenum may be selectively heated for the purpose of clearing accumulated frost, snow and ice from the windscreen surface far more efficiently and rapidly than has heretofore been possible with inside forced air heating systems. In addition, means may be provided for adding solvents and/or de-icing liquids to the air stream for cleaning and clearing purposes.

According to one specific embodiments of the invention hereinafter described in detail, a body of rigid but flexible materials such as extruded plastic or metal is bonded to the outside lower surface of the windshield to form a plenum which in turn defines a lineal nozzle operating with and extending across a substantial portion of the windscreen surface and from which air is emitted at high velocity to flow up and over the windscreen surface for clearing and cleaning purposes as well as to create an air curtain which deflects objects such as bugs from the windscreen surface. The body is preferably foil-shaped in cross section, the narrower trailing edge of the foil, in combination with the windscreen surface, defining the nozzle are and being held in closely and uniformly spaced relationship to the windscreen surface by means of teardrop-shaped spacers which are found at intervals across the affected area. A turbine or other high velocity high pressure air source is carried by the vehicle and is either electrically powered or driven by the engine to supply high pressure air to the plenum. As described above, the air may be heated by means of the vehicle exhaust system or otherwise and, if desired, solvents such as water and de-icing liquids may be added to the air stream on demand to achieve particular cleaning and clearing purposes.

A variation of the first embodiment comprises a plenum body having an integral deflector which causes air flow produced by relative movement between the vehicle and the ambient air to be directed upwardly and away from the nozzle outlet area, thereby to amplify the air curtain effect which prevents insects, rain, snow and other foreign objects from encountering or striking the surface of the windscreen during vehicle travel.

According to a second embodiment of the invention a plenum defined by a preferably foil-shaped rigid but flexible body is mounted for movement in reciprocal fashion across the outside surface of the vehicle windscreen and is supplied with high pressure air by an on-board system to emit an air curtain at high velocity in an extended lineal and essentially continuous fashion through a lineal nozzle portion to clear and clean the windscreen surface. The principal distinction between the first and second embodiments, however, is that the plenum of the second embodiment is movable in reciprocal fashion and is preferably reversed in orientation relative to the windscreen surface during each half cycle of travel so that the air curtain emitted from the nozzle is directed in advance of the nozzle and in the direction of nozzle movement. Again, the plenum body is preferably foil-shaped in profile or cross section and may be conveniently fabricated from extruded plastic or other suitable material. The nozzle may also be supplied with heated air and with solvents as desired.

Once a system of either type described above has been mounted either as original equipment or by retrofit on an automotive vehicle, the system may be extended to the clearing of other windows, backlights, headlamps and rearview mirror in a manner hereinafter described.

DETAILED DESCRIPTION OF THE ILLUSTRATIVE EMBODIMENTS

Figure 2A:
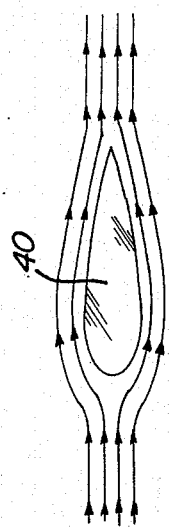
FIG. 2A is a schematic plan view of air flow around a spacer.
Figure 2:
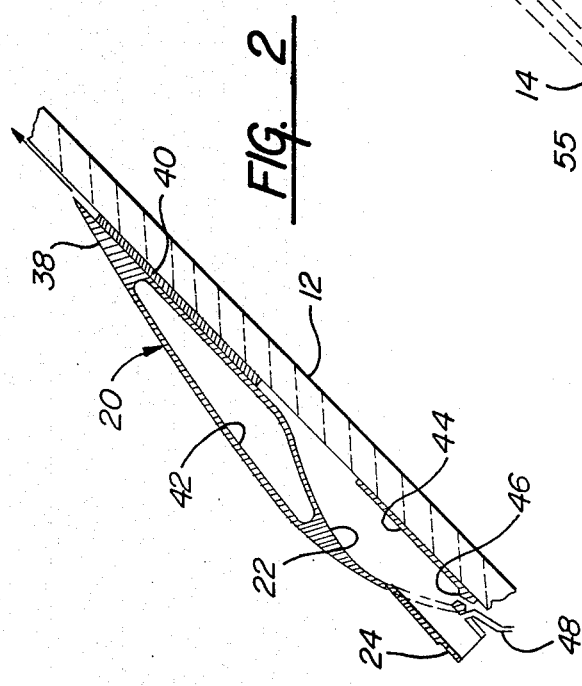
FIG. 2 is a cross-sectional view of the profile of a nozzle/plenum structure according to a first embodiment of the invention.
Figure 1:
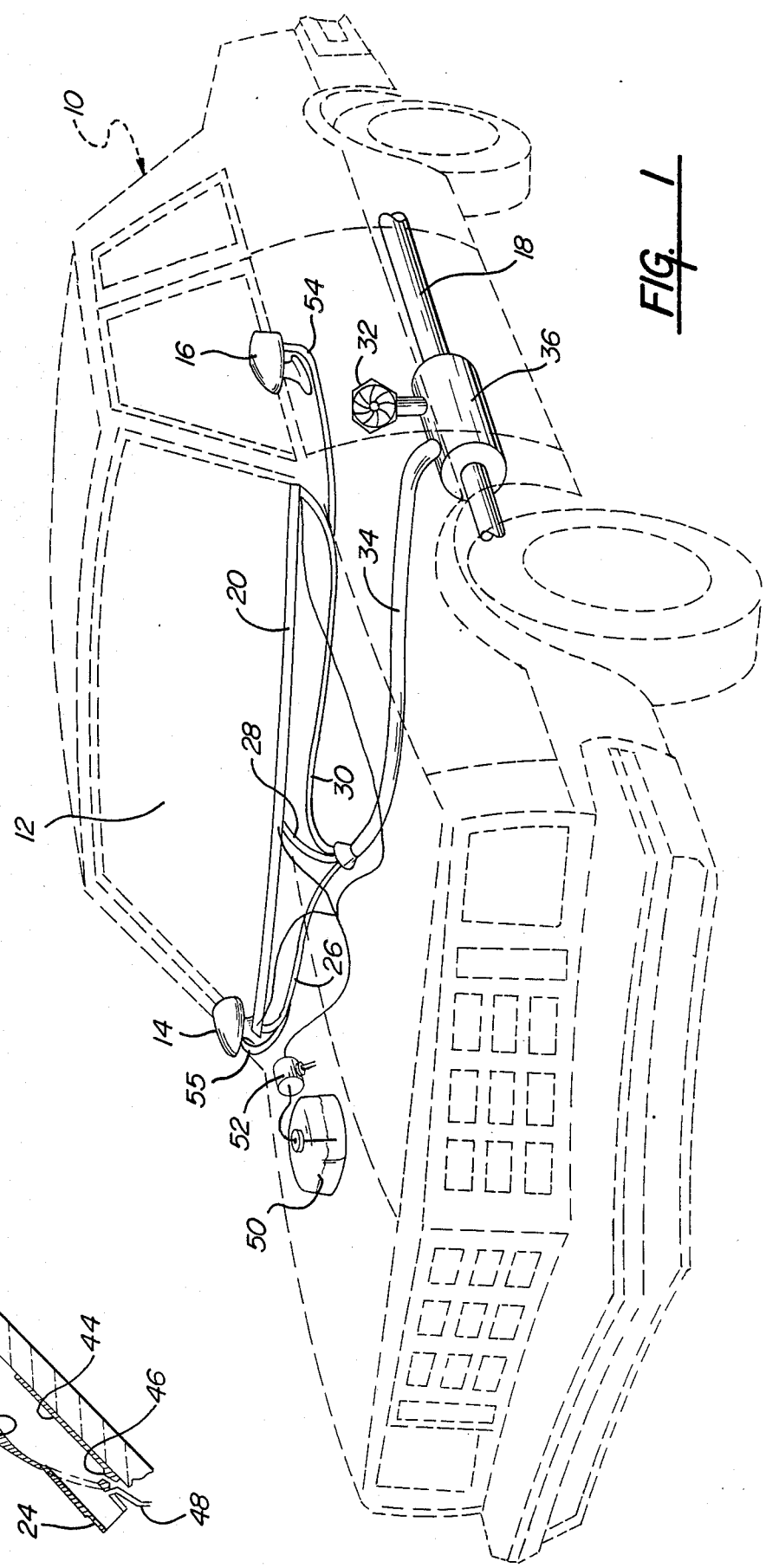
FIG. 1 is a perspective view of an automotive vehicle, in phantom, having a windscreen and outside rearview mirror clearing and cleaning system installed thereon in accordance with the invention.
Figure 4:
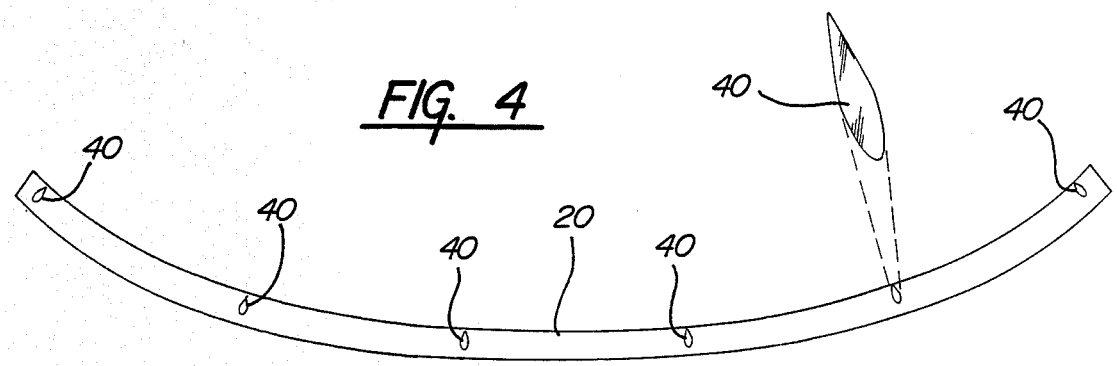
FIG. 4 is a plan view of a full width windscreen plenum/nozzle structure.

Referring first to FIGS. 1, 2 and 4, a first embodiment of the invention is shown mounted on an automobile 10 having a conventional rearwardly raked safety glass wind screen 12, outside rearview mirrors 14 and 16, and an engine effluent exhaust system comprising pipes 18.

In accordance with the invention, an extended plastic body 20 is secured to the lower portion of the exterior surface of the windscreen 12 so as to extend between the opposite extremities thereof and to define an extended plenum 22 having, by way of example, three input hose or pipe fittings 24 adapted to receive air supply hoses 26, 28 and 30 which are connected to a turbine 32 through a manifold 34. The turbine 32 may be electrically powered, pneumatically powered or mechanically driven from the vehicle engine to produce a high volume of high velocity air through the hoses 26, 28 and 30 to the plenum 22 of the extruded plastic body 20.

The body 20 is foil-shaped in profile, and the smaller tapering edge 38 is more upwardly located on the windscreen 12 and is secured in close proximity to the windscreen 12 by a plurality of teardrop-shaped plastic spacers 40 so that the gap between the body 20 and the windscreen 12 forms a continuous lineal nozzle extending essentially across the entire windscreen 12. Air which is supplied to the plenum 22 by the turbine 32 exits through the nozzle to form an essentially laminar curtain over the entire surface of the windscreen 12, the direction of air flow being from bottom to top and, therefore, in the same direction as air flow induced by relative forward movement of the automobile 10 through ambient air during normal operation. Because the spacers 40 are teardrop-shaped and the sharp end of the teardrop is located toward the upper portion of the adhesively bonded area, the air curtain exiting through the nozzle from the plenum 22, although it must separate to go around the spacer 40, essential rejoins to form a continuous sheet-like air curtain. The body 22 is preferably hollowed at 42 for light weight and strength. A base portion 44 is also adhesively secured to the outside surface of the windscreen 12 to hold the body in place. Weep holes 46 are formed in the body 20 toward the lower extremity thereof to permit moisture and other accumulated fluids to drain from the plenum 22.

A supply line 48 connected to the body 20 in the area immediately adjacent supply inlet 24 is connected to a source 50 of de-icing and windshield clearing fluid through an electrically operated pump 52. De-icing and cleaning fluid may, therefore, be supplied on demand to the high velocity airstreams whereupon such fluids are sprayed over the windscreen 12 to perform a cleaning and/or defrosting or de-icing function. In combination with air from turbine 32, selectively heated by exhaust cuff 36, the fluid sprayed onto the windscreen surface is quickly dried to leave a clear and clean surface for maximum visibility.

Air supply hoses may also be connected from the turbine 32 to the outside rearview mirrors 14 and 16 to emit air upwardly over the surfaces of the mirrors to effect a cleaning and clearing action similar to that which is realized with respect to the windscreen 12. The mirror installations may have smaller versions of the extruded body 20 or may simply utilize fan-shaped nozzles in view of the relatively small surface areas involved.

The body 20 may be extruded from a number of rigid but flexible plastics which are easily adhesively bonded, both to the windscreen 12 and to an intermediate plastic spacer 40 which is bonded to the windscreen 12. Alternative materials including metals such as aluminum may also be employed for the fabrication of body 20. The spacing between the inside surface of the body 20 in the area of the foil edge 38 and the surface of the windscreen 12 is defined by the thickness of spacers 40. This dimension may be on the order of 0.05 inches.

Figure 3:
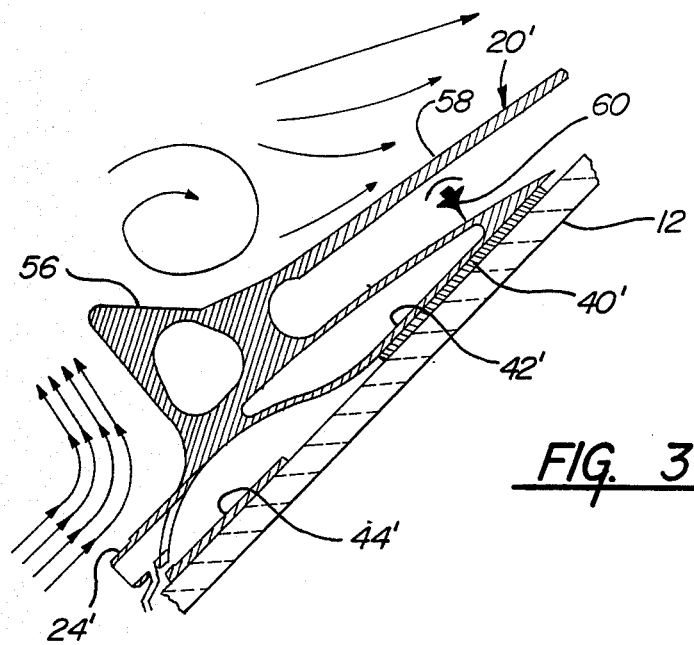
FIG. 3 is a cross-sectional view of the profile of the second plenum/nozzle structure representing a variation in the first embodiment.

Referring now to FIG. 3, a modification of the embodiment of FIG. 2 is shown to comprise a rigid extruded body 20' which, overall, approximates the extrusion 20 and is located on the vehicle windscreen 12 in the same location. Extruded body 20' exhibits near the lower extremity a continuous outwardly projecting wind deflector portion 56 which causes air flow due to relative movement between the automobile 10 and the ambient air to be directed upwardly and outwardly away from the outside surface of the windscreen 12. The body 25 may also exhibit an outer flap 58 which extends fully across the body 20' to define an interior pocket for the parking of conventional wiper blades 60.

The balance of the body 25 is essentially identical to that of body 20 and exhibits the same foil shape in cross section as the body 20. Reference numerals with primes indicating similar or identical component areas are used in FIG. 3.

Figure 5:
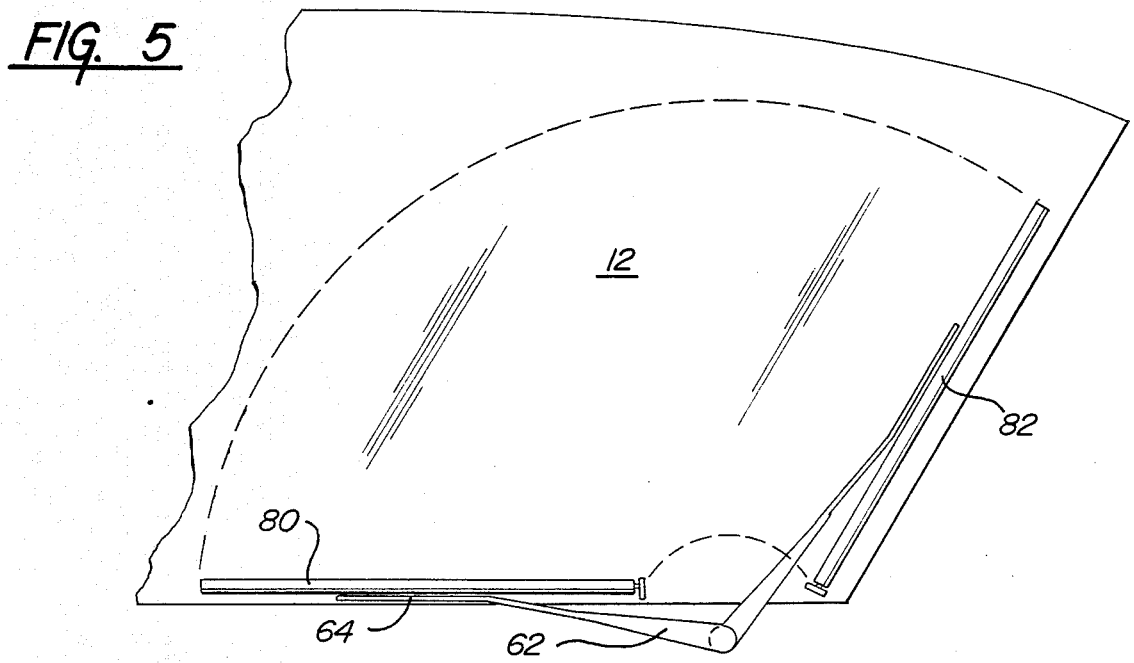
FIG. 5 is a perspective view of a second embodiment of the invention wherein the plenum/nozzle structure is reciprocally moved across the windscreen surface in the manner of a conventional wiper blade.
Figure 6:
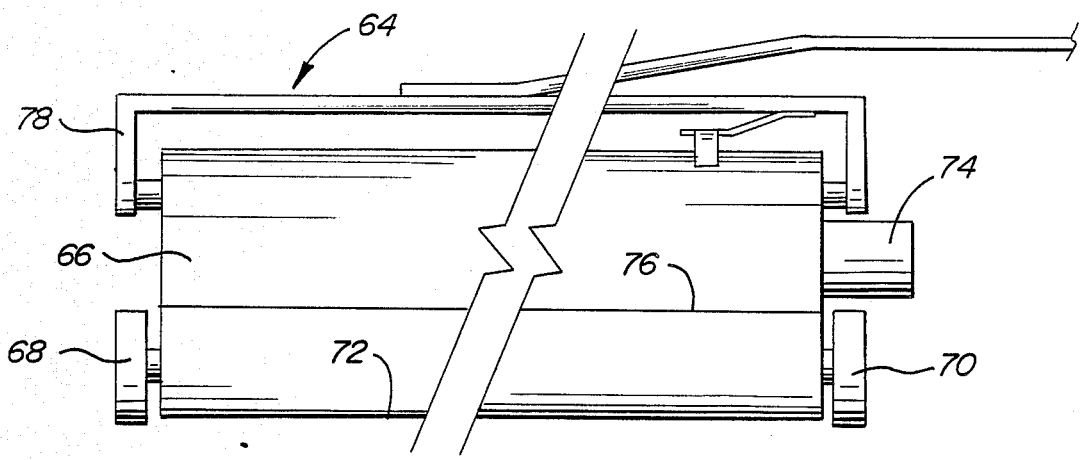
FIG. 6 is a compressed side view of a wiper arm and plenum/nozzle according to the second embodiment.

Referring now to FIGS. 5, 6 and 7, a second embodiment of the invention in which the plenum and nozzle structures are movable across the windscreen surface will be described.

In FIG. 5 a rigid elongate combination plenum/nozzle 64 is shown mounted to the conventional arcuately reciprocating wiper arm 62 on one side of the windscreen 12 of vehicle 10. Plenum/nozzle 64 is formed by a foil-shaped rigid but flexible body 66 which may be constructed of various materials including plastics and metals. Body 66 is provided with soft rubber or plastic rollers 68 and 70 at the opposite ends thereof which rollers ride on the outer surface of windscreen 12 as the body 66 is moved between opposite extremes of movement by the wiper arm 62. The body 66 is open at the small tapered end to form a lineal nozzle 72 from which a laminar air curtain is emitted when the air supply inlet 74 is connected to the turbine 32 of the vehicle 10 through hoses (not shown). An interior baffle 76 assists in the even distribution of air from the supply inlet 74 throughout the plenum which is formed by and within the body 66.

The wiper arm 62 is mounted to the body 66 by means of a bracket 78 having end pivot pins which fit into off-center holes in the end surfaces of the plenum body 66. In this manner plenum body 66 is pivotal relative to wiper arm 62 at an over-center pivot point on plenum body 66. A spring latch 84 is employed to secure the wiper arm to the bracket 78.

Figure 7A:
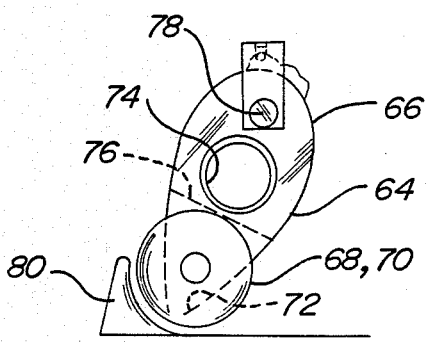
FIG. 7A is an end view of a plenum/nozzle according to the second embodiment in one operating condition.
Figure 7B:
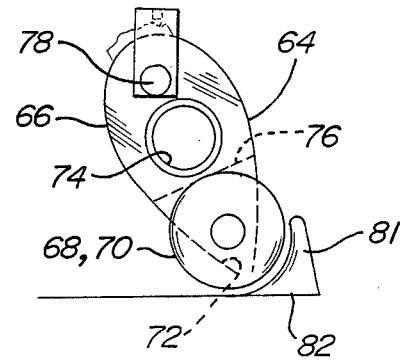
FIG. 7B is an end view of the plenum/nozzle in a second operating condition.

The outer surface of the windscreen 12 is provided with two clear plastic contoured roller stops 80 and 82. Roller stop 80 is mounted adjacent and parallel to the bottom of the windscreen 12 and the roller stop 82 is mounted adjacent and parallel to the left extremity of the windscreen 12 when viewed from the driver's position. Each roller stop 80 and 82 is provided with an arcuate ramp surface 81, the leading edge of which lies essentially flush with the surface of windscreen 12. As shown in FIGS. 7A and 7B, the function of each of the roller stops 80 and 82 is to smoothly receive and retain the rollers and nozzle of the plenum/nozzle 64 on arcuate ramp surfaces 81 just before the end of the wiper arm travel and to cause the final increment of wiper arm travel to turn the body 66 over in the manner of an over-center latch or ratchet about its over-center pivot point as the rollers are retained by ramp surfaces 81. This reverses the direction of air flow so that the air curtain always leads the body 66 irrespective of the direction of travel during the reciprocal cycle of wiper arm 62.

Although the over-center latch to reverse the direction of air flow from the plenum/nozzle is believed at this time to be preferred arrangement for a moveable plenum/nozzle, it is also possible to operate the moveable plenum/nozzle with a single and continuous or constant direction of air flow; i.e. in the upbound direction as the wiper arm 62 is in the lowermost or parked position shown in FIG. 5. In this arrangement the direction of air flow from the plenum/nozzle 64 is always more or less in the same direction as air flow caused by movement the automobile 10 through ambient air.

Various modifications and additions to the invention embodiments as described herein may be made.

I claim:

1. For use in combination with the windscreen of an automotive vehicle:
   an elongate, flexible body adapted to be adhesively mounted on and extending across the lower extension surface of said windscreen and having a lower portion defining a plenum, said body further having an upper portion contiguous with said lower portion which, in combination with said windscreen surface, defines a continuous lineal nozzle extending across a substantial area of the windscreen;
   a plurality of spaced-apart spacer means bonded to and between said upper portion and said windscreen surface for mounting the body on the windscreen with the upper portion in substantially uniformly spaced relation to the outer surface of the windscreen to direct air at high velocity from the plenum across the windscreen surface; and
   means for supplying air under pressure to the plenum such that the air directed from the nozzle portion flows at high velocity across the windscreen surface.

2. Apparatus as defined in claim 1 wherein the plenum means comprises an elongate substantially rigid but flexible body.

3. Apparatus as defined in claim 2, wherein the rigid body is essential air foil-shaped in section.

4. Apparatus as defined in claim 1, further including deflector means for directing air flow caused by relative motion between the automotive vehicle and ambient air to be diverted over the plenum means and essentially away from the windscreen surface.

5. Apparatus as defined in claim 2, further including deflector means integral with the plenum means for directing air flow caused by relative motion between the automotive vehicle and ambient air away from the windscreen surface.

6. Apparatus as defined in claim 3, further including deflector means integral with the plenum means for directing air flow caused by relative motion between the automotive vehicle and ambient air away from the windscreen surface.

7. Apparatus as defined in claim 1, wherein the plenum means is permanently mounted on the windscreen and is further provided with one or more weep apertures to permit fluid collecting in the plenum to drain.

8. Apparatus as defined in claim 7, further including a windshield wiper parking slot formed integrally with the plenum means.

9. Apparatus as defined in claim 1, further including means for heating the air supplied under pressure to the plenum.

10. Apparatus as defined in claim 9, wherein the heater means is associated with the exhaust system of the automotive vehicle.

11. Apparatus as defined in claim 1, further including means for adding at least a first liquid to the air supplied under pressure to the plenum.

12. Apparatus as defined in claim 9, further including means for directing air under pressure to at least one outside rearview mirror.

13. In combination with the windscreen of an automotive vehicle:
   a substantially flexible elongate body defining a plenum which, when combined with said windscreen defines a continuous lineal outlet nozzle portion extending across a substantial area of the windscreen;

means including a plurality of spacers mediate said body and the exterior surface of the windscreen and adhesively bonded to each of said surface and said body for mounting the plenum body on the windscreen with the nozzle portion in closely, substantially uniformly spaced relation to the outer surface of the windscreen to direct air from the plenum across the windscreen surface; and means for supplying air under pressure to the plenum such that the air directed from the nozzle flows at high velocity upwardly and across the windshield surface.

14. Apparatus as defined in claim 13, wherein said spacers are streamlined in shape and are disposed between the nozzle portion and the outer surface of the windscreen.

15. Apparatus as defined in claim 13, wherein the plenum is bonded to the surface of the windscreen.

16. Apparatus as defined in claim 13, further including deflector means associated with the plenum for directing air flow caused by relative motion between the automotive vehicle and the ambient air to be directed away from the outlet nozzle portion.

* * * * *